US012285805B2

(12) United States Patent
Yamauchi et al.

(10) Patent No.: US 12,285,805 B2
(45) Date of Patent: Apr. 29, 2025

(54) METHOD FOR PRODUCING SILVER NANOWIRES, SILVER NANOWIRES, DISPERSION, AND TRANSPARENT CONDUCTIVE FILM

(71) Applicant: Microwave Chemical Co., Ltd., Osaka (JP)

(72) Inventors: Tomohisa Yamauchi, Osaka (JP); Kei Sakamoto, Osaka (JP)

(73) Assignee: Microwave Chemical Co., Ltd., Osaka (JP)

(*) Notice: Subject to any disclaimer, the term of this patent is extended or adjusted under 35 U.S.C. 154(b) by 0 days.

(21) Appl. No.: 17/541,553

(22) Filed: Dec. 3, 2021

(65) Prior Publication Data

US 2022/0088678 A1 Mar. 24, 2022

Related U.S. Application Data

(62) Division of application No. 16/307,877, filed as application No. PCT/JP2017/040216 on Nov. 8, 2017, now abandoned.

(30) Foreign Application Priority Data

Dec. 12, 2016 (JP) ................................ 2016-240080

(51) Int. Cl.

*H01B 1/22* (2006.01)
*B22F 1/00* (2022.01)
(Continued)

(52) U.S. Cl.

CPC .................. *B22F 9/24* (2013.01); *B22F 1/00* (2013.01); *B22F 1/0547* (2022.01); *B22F 1/16* (2022.01);
(Continued)

(58) Field of Classification Search

CPC .......... B22F 1/00; B22F 1/054; B22F 1/0547; B22F 1/16; B22F 1/17; B22F 9/24;
(Continued)

(56) References Cited

U.S. PATENT DOCUMENTS

2013/0192423 A1 8/2013 Yang et al.
2014/0356524 A1 12/2014 Gao et al.
(Continued)

FOREIGN PATENT DOCUMENTS

CN 101428345 A 5/2009
CN 102197439 A 9/2011
(Continued)

OTHER PUBLICATIONS

Gorden, E et al. "Stability and structure of nanowires grown from silver, copper and their alloys by laser ablation into superfluid helium," Oct. 16, 2014, Physical Chemistry Chemical Physics (PCCP), vol. 14, pp. 25229-25233 (Year: 2014).*
(Continued)

*Primary Examiner* — Brian D Walck
*Assistant Examiner* — Sean P. O'Keefe
(74) *Attorney, Agent, or Firm* — Troutman Pepper Locke LLP

(57) ABSTRACT

In order to provide a method for producing silver nanowires in which a local maximum of optical absorption in the plasmon absorption band can be shifted toward the short wavelength side without making the wire diameter smaller, a method for producing silver nanowires includes a step of heating a mixed liquid of a dispersion of silver nanowires and metal ions of a transition metal that is different from silver, and reducing the metal ions, thereby intermittently precipitating clumps of the transition metal on a surface of the silver nanowires. The thus produced silver nanowires have metal clumps intermittently along the length direction,
(Continued)

and a local maximum of optical absorption in the plasmon absorption band of the silver nanowires has been shifted toward the short wavelength side.

6 Claims, 6 Drawing Sheets

(51) Int. Cl.

| | |
|---|---|
| ***B22F 1/054*** | (2022.01) |
| ***B22F 1/16*** | (2022.01) |
| ***B22F 1/17*** | (2022.01) |
| ***B22F 9/24*** | (2006.01) |
| ***C22C 1/04*** | (2023.01) |

(52) U.S. Cl.
CPC .............. *B22F 1/17* (2022.01); *C22C 1/0466* (2013.01); *H01B 1/22* (2013.01); *Y10S 977/762* (2013.01)

(58) Field of Classification Search
CPC .......... C22C 1/0466; H01B 1/02; H01B 1/22; H01B 13/00; H01B 5/00; H01B 5/14; Y10S 977/762
See application file for complete search history.

(56) References Cited

U.S. PATENT DOCUMENTS

| | | | | |
|---|---|---|---|---|
| 2014/0374146 | A1* | 12/2014 | Saito | C30B 7/14 174/251 |
| 2015/0104936 | A1 | 4/2015 | Markovich et al. | |
| 2015/0208498 | A1 | 7/2015 | Poon | |
| 2016/0208360 | A1 | 7/2016 | Sun et al. | |
| 2016/0346839 | A1 | 12/2016 | Ishii et al. | |
| 2018/0033516 | A1 | 2/2018 | Lee et al. | |

FOREIGN PATENT DOCUMENTS

| | | | |
|---|---|---|---|
| CN | 103198884 | A | 7/2013 |
| CN | 103894624 | A | 7/2014 |
| CN | 104145313 | A | 11/2014 |
| CN | 104508758 | A | 4/2015 |
| JP | 2013-144822 | A | 7/2013 |
| JP | 2015040316 | A | 3/2015 |
| JP | 5936759 | B1 | 6/2016 |
| TW | 201437300 | A | 10/2014 |

OTHER PUBLICATIONS

Notification of Reason for Refusal issued in Korean Patent Application No. 10-2019-7045514 dated Jul. 13, 2021, with machine translation.
Ding et al. "Joining of Silver Nanowires by Femtosecond Laser Irradiation Method," Material Transactions, vol. 56, No. 7, pp. 981-983: 2015.
The First Office Action issued in corresponding Chinese Patent Application No. 201780072727.2 dated Nov. 3, 2020, with machine translation.
International Search Report mailed during the prosecution of International Patent Application No. PCT/JP2017/040216.
Eun-Jong Lee, Yong-Hoe Kim, Do Kyung Hwang, Won Kook Choib, Jin-Yeol Kim, "Synthesis and optoelectronic characteristics of 20 nm diameter silver nanowires for highly transparent electrode films," RSC Adv. vol. 6, pp. 11702-11710, (2016).
First Office Action issued on Jul. 31, 2018 during the prosecution of Taiwanese Patent Application No. 106142955.
Notification of Reasons for Refusal issued on Mar. 9, 2017 during the prosecution of Japanese Patent Application No. 2016-240080.
Request for the Submission of an Opinion issued Mar. 3, 2022 during the prosecution of Korean Patent Application No. 10-2019-7015514.

* cited by examiner

METHOD FOR PRODUCING SILVER NANOWIRES, SILVER NANOWIRES, DISPERSION, AND TRANSPARENT CONDUCTIVE FILM

CROSS-REFERENCE TO RELATED APPLICATIONS

The present application is a divisional of U.S. patent application Ser. No. 16/307,877, filed Dec. 6, 2018 which claims priority to U.S. national phase application under 35 U.S.C. § 371 of International Patent Application No. PCT/JP2017/040216, filed Nov. 8, 2018, and claims benefit of priority to Japanese Patent Application 2016-240080, filed Dec. 12, 2016. The entire contents of these applications are hereby incorporated by reference.

FILED OF TECHNOLOGY

The present invention relates to, for example, a method for producing silver nanowires having metal clumps intermittently along the length direction.

BACKGROUND

Transparent conductive films are thin films that can transmit visible light and conduct electricity, and are widely used as transparent electrodes of liquid crystal displays, electro luminescence displays, touch panels, solar cells, and the like. Of these, sputtered films of indium tin oxide (ITO) are widely used as film sensors of electrostatic capacitance touch panels for devices with a small size of about four inches such as smartphones or for devices with a middle size of about seven to ten inches such as tablet devices, due to their high transparency and high conductivity.

Recently transparent conductive films that are used in large-sized touch panels for devices with a large size of 14 to 23 inches such as laptop PCs and all-in-one PCs, interactive whiteboards, and the like are required to be low-resistance films. In order to lower the resistance of ITO films, the thickness of the ITO film, which are conductive layers, has to be increased. If the thickness of ITO films increases, the visibility on the display screens is affected such as the transparency of the films decreasing or ITO patterns after patterning tending to be visible.

As a substitute for such ITO films, researches are conducted on transparent conductive films containing flexible metal nanowires that can be produced using a liquid phase method, that are low-resistance and transparent, and that are flexible. Of these, transparent conductive films using silver nanowires especially have been gaining attention due to their high conductivity and high stability. ITO is a type of ceramics and is very fragile, whereas silver is excellent in terms of malleability and ductility among metals, and has a bending strength that is further improved when shaped into a nanowire form.

As a method for producing silver nanowires, a polyol method is well known in which silver nitrate is reduced with ethylene glycol, which is polyhydric alcohol, in the presence of polyvinylpyrrolidone (PVP) (see Japanese Patent No. 5936759, etc., for example). A silver nanowire obtained by the polyol method has a five-fold multiply-twinned particle structure in which five faces of (100) are arranged adjacent to each other about the crystal face growth direction (100) of silver, and ten faces of (111) are fitted thereto, and thus the silver nanowire has a pentagonal cross-section. If this structure has a sharp angle, electrons are localized at that angle, and plasmon absorption increases, which leads to a deterioration in the transparency due to a remaining yellowish color or the like. Eun-Jong Lee, Yong-Hoe Kim, Do Kyung Hwang, Won Kook Choib, Jin-Yeol Kim, "Synthesis and optoelectronic characteristics of 20 nm diameter silver nanowires for highly transparent electrode films", RSC Adv. Vol. 6, pp. 11702-11710, 2016 describes the wire diameter and an improvement of the optical characteristics. Eun-Jong Lee et al. proposes a method for improving the transparency in the visible light region, by blue-shifting a peak top of plasmon absorption unique to a silver nanowire in a visible light region toward the short wavelength side, i.e., 375, 370, and 365 nm, by making the wire diameter smaller to 40, 30, and 20 nm.

SUMMARY

Technical Problem

As described in Eun-Jong Lee, et al., it is possible to shift a local maximum of optical absorption in the plasmon absorption band toward the short wavelength side by making the wire diameter of a silver nanowire smaller. However, a smaller wire diameter lowers a thermal stability which leads to a problem in which an expected conductivity cannot be obtained due to a breakage of a silver nanowire when the wire is applied to a film and dried.

The present invention was made in order to solve the above-described problem, and it is an object thereof to provide a method for producing silver nanowires and the like in which a local maximum of optical absorption in the plasmon absorption band can be shifted toward the short wavelength side without making the wire diameter of silver nanowires smaller.

The inventors of the present invention conducted an in-depth study in order to achieve the above-described object, and found that, if metal clumps are intermittently present along the length direction of silver nanowires, a local maximum of optical absorption in the plasmon absorption band can be shifted toward the short wavelength side without making the wire diameter smaller, and thus the present invention was completed.

That is to say the present invention is as follows.

The present invention is directed to a method for producing silver nanowires having metal clumps intermittently along a length direction, including a step of heating a mixed liquid of a dispersion of silver nanowires and metal ions of a transition metal that is different from silver, and reducing the metal ions, thereby intermittently precipitating clumps of the transition metal on a surface of the silver nanowires.

Furthermore, in the method for producing silver nanowires according to the present invention, it is possible that, in the step of precipitating clumps of the transition metal, a heating temperature of the mixed liquid is 300° C. or less.

Furthermore, in the method for producing silver nanowires according to the present invention, it is possible that the transition metal is copper, in the step of precipitating copper, clumps of silver are also precipitated on both sides of each clump of copper, the method further includes a step of removing clumps of copper precipitated on the surface of the silver nanowires, and the metal clumps are clumps of silver precipitated on both sides of each clump of copper in the step of precipitating copper.

Furthermore, in the method for producing silver nanowires according to the present invention, it is possible that the metal clumps are clumps of the transition metal precipitated in the step of precipitating the transition metal.

Furthermore, in the method for producing silver nanowires according to the present invention, it is possible that the transition metal is at least one selected from among nickel, iron, and cobalt.

Furthermore, the present invention is directed to silver nanowires, having metal clumps intermittently along a length direction, wherein the metal clumps are precipitates.

Furthermore, in the silver nanowires according to the present invention, it is possible that the metal clumps are clumps of one or more selected from among silver, nickel, iron, and cobalt.

Furthermore, the present invention is directed to a dispersion containing the above-described silver nanowires.

Furthermore, the present invention is directed to a transparent conductive film containing the above-described silver nanowires.

Furthermore, the present invention is directed to a method for producing silver nanowires having metal oxide clumps intermittently along a length direction, including a step of heating a mixed liquid of a dispersion of silver nanowires and metal ions of a transition metal that is different from silver, and reducing the metal ions, thereby intermittently precipitating clumps of the transition metal on a surface of the silver nanowires, and exposing, to air, the silver nanowires on whose surface the clumps of the transition metal are precipitated, thereby oxidizing the clumps of the transition metal.

Furthermore, the present invention is directed to silver nanowires, having metal oxide clumps intermittently along a length direction, wherein the metal oxide clumps are oxide of precipitates of a metal.

According to the method for producing silver nanowires and the like of the present invention, a local maximum of optical absorption in the plasmon absorption band can be shifted toward the short wavelength side without making the wire diameter smaller.

DETAILED DESCRIPTION

Figure 1:
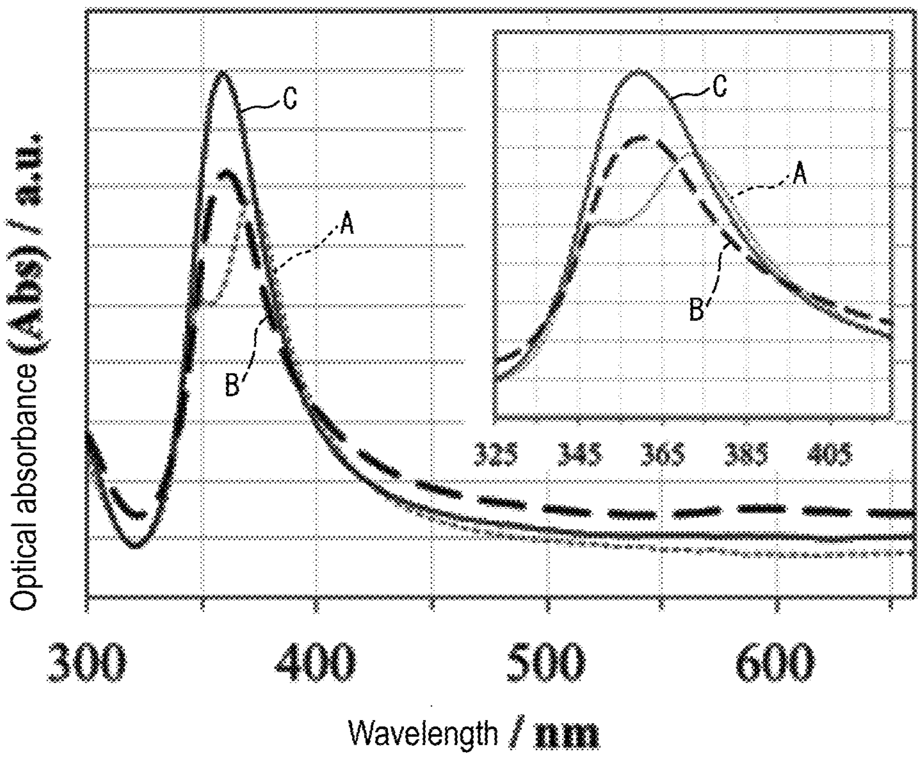
FIG. 1 shows a graph of absorption spectra of dispersions A, B, and C obtained in Example 1.

Hereinafter, a description will be given of a method for producing silver nanowires having metal clumps intermittently along the length direction, including a step of heating a mixed liquid of a dispersion of silver nanowires and metal ions of a transition metal, and reducing the metal ions, thereby intermittently precipitating clumps of the transition metal on a surface of the silver nanowires.

There is no limitation on how to produce a dispersion of silver nanowires as a starting material, as long as a dispersion containing silver nanowires is produced. The silver nanowires may be produced, for example, using a polyol method, using a method in which a silver complex solution is added to aqueous solvent containing a halogen compound and a reducing agent and is heated, or using other methods. The silver nanowires as a starting material are preferably such that the wire diameter is constant along the length direction, that is, the wire diameter does not change at any point in the length direction (see FIGS. 2(*a*) and 3(*a*), for example). The state in which the wire diameter is constant along the length direction may refer to, for example, a state in which, when the wire diameter of one silver nanowire is measured at multiple points for each constant length (e.g., for each 50 nm) and a standard deviation is calculated using the measurement result, an average standard deviation obtained by averaging standard deviations of multiple silver nanowires, each standard deviation being calculated for one silver nanowire, is 5 nm or less. A silver nanowire whose wire diameter is constant along the length direction has two peak tops (e.g., 347 nm and 371 nm) in the plasmon absorption band in a methanol dispersion. Accordingly a silver nanowire having such two peak tops in the plasmon absorption band may be considered as a silver nanowire whose wire diameter is constant along the length direction. In order to prevent silver nanowires from being broken during production of a transparent conductive film, the silver nanowires preferably have a larger average diameter. The silver nanowires as a starting material may have an average diameter of 20 nm or more, 25 nm or more, or 30 nm or more. On the other hand, in order to improve the transparency and to prevent the wavelength of a local maximum of optical absorption in the plasmon absorption band from being shifted toward the long wavelength side, the silver nanowires preferably have a smaller average diameter. The silver nanowires may have an average diameter of 50 nm or less, 45 nm or less, or 40 nm or less. The silver nanowires as a starting material may have an average diameter of, for example, 20 to 50 nm. The average diameter of the silver nanowires as a starting material may be obtained, for example, by averaging the wire diameters of multiple silver nanowires measured at one point per silver nanowire, or by averaging the wire diameters of one silver nanowire measured at multiple points and further averaging the average values of the wire diameters of multiple silver nanowires.

The dispersion of silver nanowires as a starting material may be a dispersion either before or after purifying the silver nanowires. Examples of dispersion solvent of the dispersion include polyol, as well as water, alcohols such as methanol, ethanol, 1-propanol, 2-propanol, butanol, pentanol, and hexanol, ethers such as tetrahydrofuran and dioxane, amides such as formamide, acetamide, N,N-dimethylformamide, and N,N-dimethylacetamide, N-methyl-2-pyrrolidinone, organic sulfur compounds such as dimethyl sulfoxide, and monoterpene alcohols such as terpineol. Examples of polyol are as described later. The dispersion solvents may be used alone or in a combination of two or more. The dispersion may or may not contain a resin such as PVP.

The metal ions are ions of a transition metal that is different from silver. There is no particular limitation on the transition metal, but, for example, it may be a transition metal in the fourth period, or may be a transition metal in a period other than the fourth period. There is no particular limitation on the transition metal in the fourth period, but, for example, it may be at least one selected from among copper, nickel, iron, cobalt, and titanium, or may be other transition metals in the fourth period. There is no particular limitation on the transition metal in a period other than the fourth period, but, for example, it may be molybdenum or tungsten. The metal ions may or may not have, for example, a ligand. For example, metal ions and ammonia or organic ligands may be bonded to each other through coordinate bonding to form a metal complex. The metal ions may be, for example, copper ions, nickel ions, iron ions, or cobalt ions. When metal ions form a metal complex, the metal complex may be, for example, an organic metal complex, or may be an ammine complex. There is no particular limitation on the organic metal complex, but, for example, it may have one or more types of ligands selected from among carboxylic acid ions, 8-diketonato ligands such as acetylacetonate, triphenylphosphine, and amine compounds. There is no particular limitation on the carboxylic acid ions, but examples thereof include acetic acid ions, formic acid ions, saturated fatty acid ions, unsaturated fatty acid ions, hydroxy acid ions, dicarboxylic acid ions, and bile acid ions. The saturated fatty acid ions may be, for example, myristic acid ions, stearic acid ions, or the like. The unsaturated fatty acid ions may be, for example, oleic acid ions, linoleic acid ions, or the like. The hydroxy acid ions may be, for example, citric acid ions, malic acid ions, or the like. The dicarboxylic acid ions may be, for example, oxalic acid ions, malonic acid ions, succinic acid ions, or the like. The bile acid ions may be, for example, cholic acid ions, or the like. There is no particular limitation on the metal complex, but, for example, it may be a complex expressed by General Formula X. In the formula, M is an atom of a transition metal, n is the valence of the transition metal, L is $NH_3$ or amine, and m is the coordination number of the atom M. X may be a halogen ion, $NO_3^-$, $SO_4^{2-}$, $PF_6^-$, $BF_4^-$, or the like. The amine may be, for example, R—$NH_2$, RR'—NH, $NH_2$—R—$NH_2$, a heterocycle compound such as pyridine or bipyridine, or the like. R and R' are each independently a hydrocarbon group that may have a substituent. The ammine complex is a complex having ammine (ammonia) as a ligand. Examples of the ammine complex include a tetraamminecopper complex, a hexaamminenickel complex, a hexaamminecobalt complex, and a hexaammineiron complex. The metal complex may have, for example, a ligand that is a water molecule. The metal complex is preferably a metal complex in which a counter anion is an organic ligand, or an ammine complex in which ammonia is a ligand, in order to obtain a lower metal reducing temperature. Also, since a counter anion composed of an inorganic compound such as a halogen ion, $NO_3^-$, or $SO_4^{2-}$ may remain in the system and be incorporated into nanowires, the metal complex is preferably a metal complex in which a counter anion is an organic ligand, or an ammine complex. Accordingly the metal complex is preferably a metal complex in which a carboxylic acid ion is a ligand, and preferable examples thereof include comparatively inexpensive copper formate, copper acetate, nickel formate, and nickel acetate. The metal ions and the metal complexes may be used alone or in a combination of two or more.

The mixed liquid of a dispersion of silver nanowires and metal ions is prepared by mixing these substances. The mixing may be performed, for example, through mixing of a dispersion of silver nanowires and a metal salt or metal complex, or through mixing of a dispersion of silver nanowires and a metal ion solution. The metal ion solution may be, for example, added dropwise to the dispersion of silver nanowires. Examples of the metal salt include a halogenated salt, a sulfate, a nitrate, and a hydroxide of the transition metal. The halogenated salt may be, for example, a copper chloride, a nickel chloride, a ferric chloride, a cobalt chloride, or the like. Examples of solvent of the metal ion solution include water, monohydric alcohol, and polyol. The monohydric alcohol may be, for example, methanol, ethanol, 1-propanol, 2-propanol, butanol, or the like. Examples of polyol are as described later. The solvent thereof may or may not contain a resin serving as a viscosity modifier for dispersing transition metal ions. The resin may be, for example, PVP. If the metal ion solution contains PVP, there is no particular limitation on the weight average molecular weight of the PVP, but, for example, it may be in the range of 30000 to 1200000. There is no limitation on the procedure as long as the dispersion of silver nanowires and the metal ions are ultimately mixed with each other. For example, if the metal ions form a metal complex, the dispersion of silver nanowires and substances for preparing the metal complex may be mixed with each other, as a result of which the dispersion of silver nanowires and the metal complex are mixed with each other. There is no particular limitation on the substances for preparing the metal complex, but examples thereof include an inorganic salt and an anion of the transition metal. The inorganic salt may be, for example, a copper chloride, a copper sulfate, a copper nitrate, a nickel chloride, a nickel sulfate, a nickel nitrate, or the like. The anion may be, for example, carboxylate such as sodium carboxylate or potassium carboxylate. Examples of the sodium carboxylate include sodium acetate and sodium formate, and examples of the potassium carboxylate include potassium acetate and potassium formate. For example, if copper chloride and sodium acetate are used as substances for preparing the metal complex, copper acetate can be prepared by mixing these substances. There are cases in which part of the substances for preparing the metal complex does not form a metal complex even when the substances for preparing the metal complex and the dispersion of silver nanowires are mixed with each other, and, in that case, a larger amount of substances are necessary in order to produce silver nanowires having metal clumps. Accordingly from the viewpoint of yield, it is preferable to mix the metal complex and the dispersion of silver nanowires.

Figure 5:
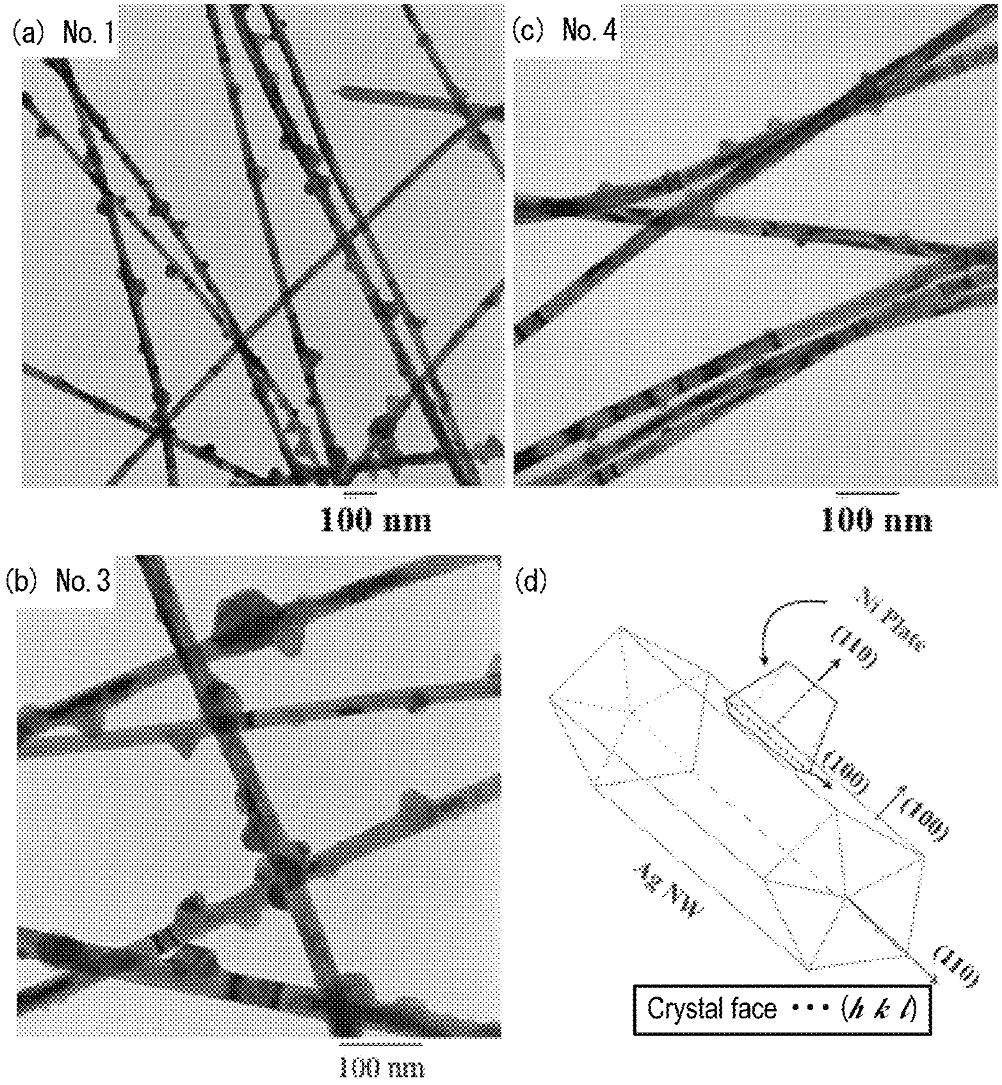
FIG. 5 shows TEM images of dispersions obtained in Example 3, and a diagram showing a plane orientation regarding precipitation of nickel crystal on a silver nanowire surface.

The silver nanowires that are to be produced have metal clumps intermittently along the length direction. The length direction of silver nanowires refers to the major axis direction (longitudinal direction). The state of intermittently having metal clumps refers to a state in which silver nanowires each have multiple metal clumps along the length direction. The metal clumps may or may not be at equal intervals. The metal clumps may be made of a metal that is the same as or different from the metal of the metal ions. As described later, for example, if the metal of the metal ions is copper, and precipitated copper is removed from the surface of silver nanowires, the metal clumps that are intermittently present on the silver nanowires that are to be produced are clumps of metal that is silver, and, if the metal of the metal ions is a transition metal other than copper, for example, at least one selected from among nickel, iron, cobalt, and titanium, or molybdenum or tungsten, the metal clumps that are intermittently present on the silver nanowires that are to be produced are clumps of metal that is the same as the metal of the metal ions. Furthermore, for example, if the metal of the metal ions is copper, and the copper is not removed, the metal clumps that are intermittently present on the silver nanowires that are to be produced are clumps of metals that are silver and copper. In this manner, the metal clumps that are intermittently present on the surface of the silver nanowires may be clumps of a single metal, or may be clumps of multiple metals. In a methanol dispersion of the silver nanowires that are to be produced, the wavelength of a local maximum of optical absorption in the plasmon absorption band may be, for example, 367 nm or less, 365 nm or less, 363 nm or less, or 360 nm or less. It is preferable that the wavelength of a local maximum of optical absorption is shorter in order to obtain a larger blue shift. The wavelength of a local maximum of optical absorption may be, for example, 300 nm or more. The silver nanowires intermittently having metal clumps may have an average diameter of, for example, 23 nm or more, 27 nm or more, 30 nm or more, or more than 35 nm. The silver nanowires may have an average diameter of, for example, 54 nm or less, 47 nm or less, or 40 nm or less. In order to shorten the wavelength of a local maximum of optical absorption in the plasmon absorption band, the average diameter is preferably smaller, and, in order to prevent breakage, the average diameter is preferably larger. The silver nanowires that are to be produced may have an average diameter of, for example, 23 to 54 nm. The average diameter of the silver nanowires that are to be produced may be obtained by averaging thicknesses of one wire measured for each 50 nm from one end, and further averaging the averages of multiple wires. The thinnest portion of the silver nanowires that are to be produced may have a diameter of 15 nm or more. The thickest portion of the silver nanowires that are to be produced may have a diameter of 100 nm or less. The silver nanowires that are to be produced may have an average CV (coefficient of variation: obtained by dividing the standard deviation with the average diameter) of 10% or more, 15% or more, or 20% or more. The silver nanowires may have an average CV of 60% or less, or 50% or less. The average CV may be obtained by calculating the CV of each wire by dividing the standard deviation of thicknesses of one wire measured for each 50 nm from one end, with the average thickness, and averaging the CVs of multiple wires. The metal clumps that are intermittently present along the length direction on the silver nanowires that are to be produced may be arranged at intervals along the length direction of, for example, 20 nm to 10 μm. One or more metal clumps may be present, for example, per 10 μm along the length direction of silver nanowires. Each metal clump may have a thickness (the diameter of the metal clump along the minor axis direction of the silver nanowire) of, for example, 1.1 to 5 times of the diameter of the trunk portion of the silver nanowire near the metal clump. The thickness of each metal clump (i.e., the wire diameter at the position of the metal clump) may be obtained by measuring the width along a direction that is orthogonal to the length direction of the silver nanowire as viewed in an electron micrograph. The diameter of the trunk portion of the silver nanowires is the diameter of the silver nanowire at a portion having no metal clumps. The metal clumps may be, for example, clumps of metal that is silver, clumps of metals that are silver and copper, or clumps of metal that is at least one selected from among nickel, iron, cobalt, titanium, molybdenum, and tungsten. If the metal of the metal clumps is silver, or silver and copper, each of the metal clumps is typically in the shape of a sphere or a spindle extending in the wire length direction, and is present around the entire circumference of the wire forming the trunk of the silver nanowire (see FIG. 2(*c*), for example). That is to say there is a silver wire forming the trunk, near the center of each of clumps of metal that is silver, or each of clumps of metals that are silver and copper. On the other hand, if the metal of the metal clumps is the same as the metal of the metal ions, such as nickel, iron, or cobalt, each of the metal clumps is typically present at part in the circumferential direction of the wire forming the trunk of the silver nanowire (see FIG. 5(*b*), for example). That is to say there is a silver wire forming the trunk, at an end of each of metal clumps. The reason for this is that, if the metal of the metal clumps is the same as the metal of the metal ions, such as nickel, iron, or cobalt, for example, as shown in FIG. 5(*d*), the metal is precipitated at one side of a pentagonal shape that is a cross-section of the silver nanowire as a starting material. The process that produces silver nanowires whose surface intermittently have metal clumps, from silver nanowires having no metal clumps may be considered as a process that changes only the surface of the silver nanowires, and thus, hereinafter, such production of silver nanowires may be referred to as surface modification of silver nanowires. The metal clumps that are intermittently present on silver nanowires subjected to surface modification are clumps of metal that is silver, copper, nickel, iron, cobalt, titanium, molybdenum, tungsten, or the like as described above, but at least part of the metal clumps may be metal oxide. For example, if the metal of the metal clumps is silver, nickel, cobalt, titanium, molybdenum, or tungsten, at least part of the surface of the metal clumps may be oxide although the oxidization is not likely to occur. For example, if the metal of the metal clumps is copper or iron, part or the whole of the metal clumps may be oxide. Accordingly the state in which metal clumps are clumps of a certain metal may be considered as a state in which the metal clumps are either clumps of that metal or clumps of that metal and its metal oxide. That is to say metal clumps of a certain metal may be considered as metal clumps at least part of which may be oxidized. It is also possible that metal oxide clumps are present instead of metal clumps on the surface of silver nanowires. The same applies to copper that is precipitated in a step of precipitating clumps of the transition metal on a surface of the silver nanowires.

Next, a description will be given of a case in which, in a method for producing silver nanowires having a step of removing precipitated metal, metal ions are copper ions, and, furthermore, a case in which, in a method for producing silver nanowires not having a step of removing precipitated metal, metal ions are nickel ions.

Method for Producing Silver Nanowires Having Step of Removing Precipitated Metal Hereinafter, a case in which, in a method for producing silver nanowires having a step of removing precipitated metal, the transition metal is copper will be described. If the transition metal is copper, metal ions are copper ions. The copper ions may be, for example, copper ions having no ligand, or may be copper ions having a ligand. In the latter case, a copper complex is formed. The copper complex may be, for example, an organic copper complex, or an ammine-copper complex. There is no particular limitation on the organic copper complex, but examples thereof include copper carboxylate, a copper complex having a β-diketonato ligand such as bis(2,4-pentanedionato)copper, triphenylphosphine copper, a copper complex having a ligand that is an amine compound, and the like. There is no particular limitation on the copper carboxylate, but examples thereof include copper acetate, copper formate, saturated fatty acid copper salt, unsaturated fatty acid copper salt, hydroxy acid copper salt, copper dicarboxylate, and bile acid copper salt. The fatty acid copper may be, for example, long-chain copper alkylcarboxylate. The saturated fatty acid copper salt may be, for example, copper myristate, copper stearate, or the like. The unsaturated fatty acid copper salt may be, for example, copper oleate, copper linoleate, or the like. The hydroxy acid copper salt may be, for example, copper citrate, copper malate, or the like. The copper dicarboxylate may be, for example, copper oxalate, copper malonate, copper succinate, or the like. The bile acid copper salt may be, for example, copper cholate or the like. In a step of intermittently precipitating clumps of copper on a surface of the silver nanowires, the ratio (atomic ratio) of the copper atoms with respect to the silver atoms in the mixed liquid of the dispersion of silver nanowires and the copper ions is preferably 0.01 to 0.9. When the mixed liquid of the dispersion of silver nanowires and the copper ions is heated, the copper ions are reduced, and clumps of copper are intermittently precipitated on the surface of the silver nanowires. In a step of precipitating copper, clumps of silver are also precipitated on both sides of each clump of copper. Both sides refer to both sides along the length direction of a silver nanowire. Typically, precipitated clumps of silver are smaller than clumps of copper. It is considered that the precipitation of silver is caused, for example, by migration of silver atoms in the silver nanowires or reduction of silver ions in the dispersion. The silver ions in the dispersion may exist in the dispersion from the beginning, or may be obtained through ionization of silver on the surface of the silver nanowires. Since copper is intermittently precipitated on the surface of the silver nanowires, as a result, clumps of silver are intermittently precipitated as well. When the temperature of the mixed liquid of the dispersion of silver nanowires and the copper ions is more than 300° C., a surface modified resin (e.g., PVP, etc.) that is present on the surface of the silver nanowires decomposes, and the silver nanowires aggregate, which is not preferable. Accordingly the heating temperature of the mixed liquid is preferably 300° C. or less. When the temperature of the mixed liquid is high, the silver nanowires are likely to deteriorate such as being broken. From this point of view, the heating temperature of the mixed liquid is more preferably 250° C. or less. For example, when copper chloride is dissolved in solvent, a copper ion solution having no ligand is obtained, but even copper ions alone are reduced at approximately 250° C. Accordingly, the temperature of the mixed liquid having copper ions having no ligand is preferably approximately 250° C. The heating temperature of the mixed liquid is more preferably 200° C. or less. The heating temperature of the mixed liquid of the dispersion of silver nanowires and the copper complex is preferably a temperature that is lower than the reducing temperature of the copper complex alone. Since silver acts as a reduction catalyst for copper ions, these ions are reduced at a temperature that is lower than the reducing temperature of the copper complex alone in the presence of silver. Accordingly when the mixed liquid is heated to a temperature that is lower than the reducing temperature, reduction of copper ions selectively progresses on the surface of the silver nanowires, and precipitation of copper nanoparticles preferentially occurs on the silver nanowire surface. As a result, reduction of copper can be suppressed at a position other than the surface of the silver nanowires, and the copper complex can be efficiently used for precipitation on the silver nanowire surface. From this point of view, the heating temperature of the mixed liquid is more preferably 160° C. or less. The temperature of the mixed liquid may be 60° C. or more, 100° C. or more, 120° C. or more, 130° C. or more, or 140° C. or more. For example, if the copper complex is copper acetate, heating may be performed such that the temperature of the mixed liquid is 140° C. or more. If the copper complex is a tetraamminecopper complex, heating may be performed such that the temperature of the mixed liquid is 100° C. or more. For example, if copper ions do not form a complex, heating may be performed such that the temperature of the mixed liquid is 200° C. or more. In heat reduction, in order to prevent the silver nanowires from deteriorating, the heating is preferably performed in an inert atmosphere. The inert atmosphere may be, for example, an atmosphere with inert gas such as nitrogen gas or argon gas. It is also possible to prevent copper from being oxidized by performing the heating in an inert atmosphere. There is no limitation on the order between the mixing of a dispersion of silver nanowires and copper ions and the heating. For example, it is possible to mix these substances and then perform heating, or to heat the dispersion of silver nanowires to a target temperature and then add copper ions dropwise to the dispersion. When mixing the dispersion of silver nanowires and the copper ions and when precipitating copper on the surface of the silver nanowires, stirring may be performed. The stirring may be, for example, rotary stirring, swing stirring, or the like. The heating of the mixed liquid may be performed, for example, through irradiation with microwaves, or using other heating units such as an oil bath. The frequency of microwaves and the microwave irradiation method regarding the microwave heating are as described later.

The method for producing silver nanowires may further include, after the step of precipitating copper, a step of removing clumps of copper precipitated on the surface of the silver nanowires. Copper nanoparticles with a particle size of 100 nm or less are immediately oxidized to oxidized copper through exposure to air at room temperature. Since the durability and the conductivity deteriorate when oxidized copper is present on the silver nanowire surface in this manner, the clumps of copper may be removed. In the step of removing clumps of copper, for example, it is preferable that an ammonia aqueous solution or an ammonium salt aqueous solution and the dispersion of silver nanowires are mixed with each other, so that clumps of copper are dissolved as copper ions and removed. Examples of the ammonium salt include ammonium chloride ($NH_4Cl$) and ammonium bromide ($NH_4Br$). Since copper nanoparticles precipitated on the surface of the silver nanowires immediately elute into polar solvent as tetraamminecopper (II) complex in the presence of halogen ions in air, they are likely to be removed from the silver nanowires. Ultimately, only metal clumps that are clumps of silver precipitated on both sides of each clump of copper in the step of precipitating copper remain on the surface of the silver nanowires. Clumps of metal that is silver are not likely to be oxidized. When clumps of metal that is silver are present on the surface of silver nanowires, the wavelength of a local maximum of optical absorption in the plasmon absorption band in the methanol dispersion of silver nanowires is shifted toward the short wavelength side. In this step, the temperature of the dispersion (mixed liquid) may be, for example, at room temperature or increased to 100° C. or less.

There is no limitation on the pressure in the step of precipitating copper on the surface of the silver nanowires and the step of removing clumps of copper on the surface of the silver nanowires. That is to say, the pressure may be atmospheric pressure, increased pressure, or reduced pressure. The heating time in the step of precipitating copper on the surface of the silver nanowires may be, for example, 1 minute to 2 hours after mixing of the dispersion of silver nanowires and the copper ions is ended. The point in time when the mixing is ended is, for example, in the case in which a copper ion solution is added dropwise to the dispersion of silver nanowires, a point in time when the dropping of the copper ion solution is completely ended. The length of time of the step of removing clumps of copper on the surface of the silver nanowires may be, for example, 10 minutes to 20 hours.

Method for Producing Silver Nanowires not Having Step of Removing Precipitated Metal Hereinafter, a case in which, in a method for producing silver nanowires not having a step of removing precipitated metal, the transition metal is nickel will be described. If the transition metal is nickel, metal ions are nickel ions. The nickel ions may be, for example, nickel ions having no ligand, or may be nickel ions having a ligand. In the latter case, a nickel complex is formed. The nickel complex may be, for example, an organic nickel complex, or an ammine nickel complex. There is no particular limitation on the organic nickel complex, but, examples thereof include nickel carboxylate, a nickel complex having a β-diketonato ligand such as bis(2,4-pentanedionato)nickel, triphenylphosphine nickel, a nickel complex having a ligand that is an amine compound, and the like. There is no particular limitation on the nickel carboxylate, but examples thereof include nickel acetate, nickel formate, saturated fatty acid nickel salt, unsaturated fatty acid nickel salt, hydroxy acid nickel salt, nickel dicarboxylate, and bile acid nickel salt. The fatty acid nickel may be, for example, long-chain nickel alkylcarboxylate. The saturated fatty acid nickel salt may be, for example, nickel myristate, nickel stearate, or the like. The unsaturated fatty acid nickel salt may be, for example, nickel oleate, nickel linoleate, or the like. The hydroxy acid nickel salt may be, for example, nickel citrate, nickel malate, or the like. The nickel dicarboxylate may be, for example, nickel oxalate, nickel malonate, nickel succinate, or the like. The bile acid nickel salt may be, for example, nickel cholate or the like. It is preferable that the nickel complex is a complex having an organic ligand that is likely to be thermally decomposed. In the step of intermittently precipitating clumps of metal that is nickel on a surface of the silver nanowires, the ratio (atomic ratio) of the nickel atoms with respect to the silver atoms in the mixed liquid of the dispersion of silver nanowires and the nickel ions is preferably 0.03 or more. The atomic ratio is preferably 1.0 or less. When the mixed liquid of the dispersion of silver nanowires and the nickel ions is heated, the nickel ions are reduced, and clumps of nickel are intermittently precipitated on the surface of the silver nanowires. When the temperature of the mixed liquid of the dispersion of silver nanowires and the nickel ions is more than 300° C., a surface modified resin that is present on the surface of silver nanowires decomposes, and the silver nanowires aggregate, which is not preferable. Accordingly the temperature of the mixed liquid is preferably 300° C. or less. When the temperature of the mixed liquid is high, the silver nanowires are likely to deteriorate such as being broken. From this point of view, the temperature of the mixed liquid is more preferably 250° C. or less. For example, when nickel chloride is dissolved in solvent, a nickel ion solution having no ligand is obtained, but even nickel ions alone are reduced at approximately 250° C. Accordingly when heating the mixed liquid having nickel ions having no ligand, the temperature of the mixed liquid is preferably approximately 250° C. The temperature of the mixed liquid is more preferably 200° C. or less. The heating temperature of the mixed liquid of the dispersion of silver nanowires and the nickel complex is preferably a temperature that is lower than the reducing temperature of the nickel complex alone. Also in the case of nickel, since silver acts as a reduction catalyst for nickel ions, these ions are reduced at a temperature that is lower than the reducing temperature of the nickel complex alone. From this point of view, the heating temperature of the mixed liquid is more preferably 160° C. or less. The temperature of the mixed liquid may be 60° C. or more, 100° C. or more, 120° C. or more, 130° C. or more, or 140° C. or more. For example, if the nickel complex is nickel acetate, heating may be performed such that the temperature of the mixed liquid is 140° C. or more. For example, if the nickel ions do not form a complex, heating may be performed such that the temperature of the mixed liquid is 200° C. or more. In heat reduction, in order to prevent the silver nanowires from deteriorating, the heating is preferably performed in an inert atmosphere. There is no limitation on the order between the mixing of a dispersion of silver nanowires and nickel ions and the heating. For example, it is possible to mix these substances and then perform heating, or to heat the dispersion of silver nanowires to a target temperature and then add nickel ions dropwise to the dispersion. When mixing the dispersion of silver nanowires and the nickel ions and when precipitating nickel on the surface of the silver nanowires, stirring may be performed. The stirring may be, for example, rotary stirring, swing stirring, or the like. The heating of the mixed liquid may be performed, for example, through irradiation with microwaves, or using other heating units such as an oil bath. The frequency of microwaves and the microwave irradiation method regarding the microwave heating are as described later. Nickel precipitated on the surface of the silver nanowires is not likely to be oxidized, and thus it does not have to be removed as in the case of copper. That is to say, if the transition metal is nickel, the step of removing nickel from the surface of the silver nanowires is not necessary. In this case, the metal clumps are clumps of nickel precipitated in the step of precipitating nickel. Clumps of metal that is nickel are not likely to be oxidized.

There is no limitation on the pressure in the step of precipitating nickel on the surface of the silver nanowires. That is to say, the pressure may be atmospheric pressure, increased pressure, or reduced pressure. The heating time in the step of precipitating nickel on the surface of the silver nanowires may be, for example, 1 minute to 2 hours after mixing of the dispersion of silver nanowires and the nickel ions is ended.

Also in the case in which the metal of the metal ions is cobalt, iron, titanium, molybdenum, tungsten, or the like, it is possible to produce silver nanowires as in the method for producing silver nanowires using nickel ions. The atomic ratio, the temperature, the pressure, the time, and the like in the production method may be as in the method for producing silver nanowires using nickel ions. If the transition metal is cobalt, the metal complex may be, for example, an cobalt acetate, cobalt formate, cobalt oxalate, cobalt citrate, cobalt oleate, triphenylphosphine cobalt, an amminecobalt complex, or the like. Clumps of metal that is cobalt are not likely to be oxidized. If the transition metal is iron, the metal complex may be, for example, iron acetate, iron formate, iron oxalate, iron citrate, iron oleate, triphenylphosphine iron, an ammineiron complex, or the like. In this case, the metal clumps are clumps of the transition metal (e.g., clumps of cobalt or iron) precipitated in the step of precipitating the transition metal. It is also possible to prevent, for example, iron from being oxidized by performing the heating in an inert atmosphere. Also in the case in which the metal of the metal ions is copper, copper precipitated on the surface of the silver nanowires does not have to be removed as in the method for producing silver nanowires using nickel ions. In this case, clumps of silver and copper that are transition metals precipitated in the step of precipitating the transition metal form metal clumps, and silver nanowires on whose surface the metal clumps are intermittently present are produced. The method further includes a step of exposing, to air, the silver nanowires on whose surface the clumps of the transition metal are intermittently precipitated, thereby oxidizing the clumps of the transition metal, and thus silver nanowires having metal oxide clumps intermittently along a length direction are produced. The metal oxide of the clumps is oxide of precipitates of a metal. The metal oxide may be, for example, oxidized copper, iron oxide, or the like.

Such silver nanowires in which the wavelength of a local maximum of optical absorption in the plasmon absorption band has been shifted toward the short wavelength side in this manner may be purified using a known method. If the dispersion of silver nanowires contains a resin or the like such as PVP, the resin or the like is preferably removed through purification. For example, it is possible to decrease the resin (e.g., PVP or other surface modifiers, etc.) contained in the dispersion of silver nanowires, through dilution with dispersion solvent such as water and alcohol and then treatment such as centrifugal separation, crossflow filtration, or other filtration. Such dilution, and treatment such as filtration may be repeated. It is also possible to remove metal ions and the like as appropriate through this purification. The thus purified silver nanowires may be used, for example, to produce transparent conductive films or for other applications. When using the silver nanowires to produce transparent conductive films, a liquid dispersion of silver nanowires may be prepared, deposited on a substrate, and then dried and cured. In this manner, the produced silver nanowires may be used to prepare a liquid dispersion. The dispersion may be referred to as, for example, an ink composition or an conductive ink. The dispersion can be deposited on a substrate, and the deposited dispersion can be dried and cured, using a known method.

Method for Producing Dispersion of Silver Nanowires

As described above, there is no particular limitation on how to produce a dispersion of silver nanowires, but, for example, it may be produced using a polyol method as described below. Hereinafter, a method for producing silver nanowires will be described, the method including a first step of mixing polyol, a silver compound, and polyvinylpyrrolidone at 100° C. or less, and a second step of adding the mixed liquid mixed in the first step dropwise to a reaction solution of polyol containing a halogen compound heated to the range of 110° C. to a temperature that is lower than the boiling point.

The polyol used in the first step is alcohol having two or more alcoholic hydroxyl groups. There is no particular limitation on the polyol, but examples thereof include ethylene glycol, propylene glycol (1,2-propanediol), trimethylene glycol (1,3-propanediol), tetraethylene glycol, polyethylene glycol, diethylene glycol, triethylene glycol, polypropylene glycol, 1,2-butanediol, 1,3-butanediol, 1,4-butanediol, 2,3-butanediol, and glycerin. From the viewpoint of reactivity and viscosity, the polyol is preferably, for example, ethylene glycol, propylene glycol (PG), or trimethylene glycol. The polyols may be used alone or in a combination of two or more.

The silver compound is preferably soluble to polyol. There is no particular limitation on the silver compound, but, for example, it may be silver nitrate, silver acetate, silver benzoate, silver bromate, silver carbonate, silver citrate, silver lactate, silver nitrite, silver perchlorate, silver phosphate, silver sulfate, silver trifluoroacetate, silver thiocyanate, silver cyanide, silver cyanate, silver tetrafluoroborate, or silver acetylacetonate. The silver compound is preferably, for example, silver nitrate, silver perchlorate, or silver acetate, and more preferably silver nitrate or silver acetate.

There is no particular limitation on the weight average molecular weight of the polyvinylpyrrolidone, but, for example, it is preferably in the range of 10000 to 1500000, and more preferably in the range of 30000 to 900000. In the molar ratio, the number of moles of PVP is calculated taking one repetition unit (molecular weight: 111.14) as one mole. In the following description, the same applies to the molar ratio of PVP with respect to silver. In order to properly form precursors of PVP and silver in the mixed liquid and to synthesize silver nanowires with more uniform size, the PVP concentration (wt %) in the mixed liquid is preferably 3 wt % or more.

Furthermore, the polyol and the silver compound are preferably selected such that the silver compound and the PVP are soluble to polyol.

In the first step, there is no limitation on the order of mixing polyol, a silver compound, and PVP, but, for example, it is possible that PVP is mixed with polyol, after which a silver compound or a silver compound dissolved in polyol is added and mixed therewith. In order to dissolve a silver compound or PVP in polyol, sufficient stirring is preferably performed. The first step is not a step of producing silver species, and thus the temperature during stirring, that is, the temperature during mixing is preferably a temperature at which silver nanoparticles are unlikely to be produced. For example, Japanese Patent Publication (Tokuhyo) No. 2014-507562 states that a solution of silver species is produced by heating a mixture of ethylene glycol, PVP, and silver nitrate to 115° C., and thus the temperature in the first step is preferably lower than this temperature. Accordingly, the temperature during mixing may be, for example, 100° C. or less. It is known that, in reduction of silver ions or production of silver nanoparticles, polyol acts as both solvent and a reducing agent, and PVP acts as an reduction adjuvant although its reducing ability is very low. Accordingly in accordance with an increase in the temperature, the reduction may sequentially progress to produce silver particles. Accordingly the temperature during mixing is preferably 80° C. or less. The temperature during mixing is preferably 10° C. or more. The mixing may be, for example, rotary stirring, swing stirring, or the like. The first step is performed typically under atmospheric pressure, but also may be performed under increased pressure or under reduced pressure as necessary. From the viewpoint of handleability, atmospheric pressure is desirable. The first step is performed typically in air, but also may be performed in an inert atmosphere.

The polyol used in the second step may or may not be the same as the polyol used in the first step. Examples of the polyol are as described above. The polyol is both solvent and a reducing agent. From the viewpoint of reactivity and viscosity, the polyol is preferably, for example, ethylene glycol, PG, or trimethylene glycol. The polyols may be used alone or in a combination of two or more.

The halogen compound contained in the polyol in the second step provides halide ions such as chloride ions or bromide ions, in the polyol. There is no particular limitation on the halogen compound contained in the polyol, but it may contain a chlorine compound. The chlorine compound may be, for example, at least one selected from among inorganic chloride and organic chloride. The inorganic chloride may be, for example, at least one selected from among alkali metal chloride, alkaline-earth metal chloride, earth metal chloride, zinc group metal chloride, carbon group metal chloride, and transition metal chloride. The alkali metal chloride may be, for example, NaCl, KCl, or LiCl. The alkaline-earth metal chloride may be, for example, magnesium chloride, or calcium chloride. The earth metal chloride may be, for example, aluminum chloride. The zinc group metal chloride may be, for example, zinc chloride. The carbon group metal chloride may be, for example, tin chloride. The transition metal chloride may be, for example, manganese chloride, ferric chloride, cobalt chloride, or nickel chloride. The organic chloride may be, for example, tetraalkylammonium chloride. The tetraalkylammonium chloride is a substance expressed by a general formula $R^1R^2R^3R^4NCl$. In the formula, $R^1$ to $R^4$ may be each independently a linear or branched alkyl group with 1 to 8 carbon atoms. That is to say the tetraalkylammonium chloride may be, for example, tetramethylammonium chloride, tetraethylammonium chloride, tetrapropylammonium chloride, tetraisopropylammonium chloride, tetrabutylammonium chloride, tetrapentylammonium chloride, tetrahexylammonium chloride, tetraheptylammonium chloride, tetraoctylammonium chloride, hexadecyltrimethylammonium chloride, or methyltrioctylammonium chloride. The chlorine compounds may be used alone or in a combination of two or more. If the halogen compound contains a chlorine compound, the halogen compound may also contain a bromine compound. The bromine compound may be, for example, inorganic bromide or organic bromide. The inorganic bromide may be, for example, at least one selected from among alkali metal bromide, alkaline-earth metal bromide, earth metal bromide, zinc group metal bromide, carbon group metal bromide, and transition metal bromide. The alkali metal bromide may be, for example, NaBr, KBr, or LiBr. The alkaline-earth metal bromide may be, for example, magnesium bromide, or calcium bromide. The earth metal bromide may be, for example, aluminum bromide. The zinc group metal bromide may be, for example, zinc bromide. The carbon group metal bromide may be, for example, tin bromide. The transition metal bromide may be, for example, manganese bromide, iron bromide, cobalt bromide, or nickel bromide. The organic bromide may be, for example, tetraalkylammonium bromide. The tetraalkylammonium bromide is a substance expressed by a general formula $R^5R^6R^7R^8NBr$. In the formula, $R^5$ to $R^8$ may be each independently a linear or branched alkyl group with 1 to 8 carbon atoms. That is to say the tetraalkylammonium bromide may be, for example, tetramethylammonium bromide, tetraethylammonium bromide, tetrapropylammonium bromide, tetraisopropylammonium bromide, tetrabutylammonium bromide, tetrapentylammonium bromide, tetrahexylammonium bromide, tetraheptylammonium bromide, tetraoctylammonium bromide, hexadecyltrimethylammonium bromide, or methyltrioctylammonium bromide. The bromine compounds may be used alone or in a combination of two or more. If the halogen compound contains tetraalkylammonium chloride and tetraalkylammonium bromide, and the proportions (mol %) of tetraalkylammonium chloride and tetraalkylammonium bromide in the halogen compound are respectively taken as and, it is preferable that:

+=100,

80≤ ≤97.

The reason for this is that, if the proportion of chlorine compound contained in the halogen compound is 80 mol % or more, silver nanowires can be synthesized at high yield. Furthermore, if the halogen compound is not composed of 100% of chlorine compound, but also contains a small amount of bromine compound, the silver nanowires produced can be prevented from being thick. If the halogen compound contains the chlorine compound and the bromine compound, both the chlorine compound and the bromine compound are preferably present in the polyol reaction solution before the mixed liquid is added dropwise in the second step. Note that the molar ratio of the halogen compound contained in the reaction solution with respect to silver contained in the mixed liquid in the first step that is to be added dropwise is preferably 0.005 to 0.06. The molar ratio is more preferably 0.05 or less, and even more preferably 0.04 or less. The reason for this is that, if the molar ratio is within this range, uniform silver nanowires in which variations in the thickness of wires produced are smaller can be synthesized. The silver contained in the mixed liquid that is to be added dropwise may be considered as silver contained in the reaction solution after the mixed liquid is added dropwise. The polyol and the halogen compound are preferably selected such that the halogen compound is soluble to polyol.

Furthermore, in the second step, the polyol may further contain a surface modifier in addition to the halogen compound. The surface modifier may also be referred to as a capping agent, and facilitates growth of silver nanowires in a one-dimensional direction by preferentially adhering to a side face of silver nanowires that are to be grown. There is no particular limitation on the surface modifier, but, for example, it may be PVP, polyvinyl acetamide, or the like. They may be used alone or in a combination. There is no particular limitation on the amount of surface modifier, but the molar ratio of the surface modifier with respect to silver contained in the mixed liquid added dropwise in the second step may be 0 to 20. The molar ratio is preferably 0 to 10. A larger amount of surface modifier used requires more treatment for removing or reducing the surface modifier after producing silver nanowires, and thus a smaller amount of surface modifier used is preferable. The molar ratio of surface modifier (the surface modifier contains PVP contained in the mixed liquid) with respect to silver contained in the reaction solution after the dropping of the mixed liquid is ended is preferably 0.5 or more, and more preferably 1 or more. The reason for this is that, if the amount of surface modifier is small, spherical particles are likely to be produced. In order to prevent the silver nanowires produced from being thick, the molar ratio of surface modifier (the surface modifier contains PVP contained in the mixed liquid) with respect to silver contained in the reaction solution after the dropping of the mixed liquid is ended is preferably 2 or more, more preferably 2.5 or more, and even more preferably 3 or more. The molar ratio is preferably 20 or less, more preferably 15 or less, and even more preferably 10 or less. The reason for this is that, if the amount of surface modifier is too large, silver in the shape of particles is likely to be produced. The molar ratio is a molar ratio calculated taking one repetition unit of the surface modifier as one mole.

In the second step, the mixed liquid mixed in the first step is added dropwise to a reaction solution of polyol containing a halogen compound. At that time, the reaction solution is heated to the range of 110° C. to a temperature that is lower than the boiling point of the reaction solution. The reaction solution may be heated to the range of 110 to 200° C., or may be heated to the range of 120 to 180° C. The heating may be performed through irradiation with microwaves, or using other heating units such as an oil bath. In the heating, the temperature of the reaction solution is preferably kept constant to all extent possible. When the mixed liquid mixed in the first step is added dropwise to the reaction solution, the temperature of the reaction solution slightly decreases. Accordingly, in order to prevent the temperature from decreasing at that time, microwave heating is preferably performed. The reason for this is that microwave heating is internal heating and can be rapid heating. There is no particular limitation on the frequency of microwaves, but, for example, it may be 2.45 GHz, 5.8 GHz, 24 GHz, 915 MHz, or other frequencies ranging from 300 MHz to 300 GHz. The irradiation with microwaves may be performed at a single frequency or at multiple frequencies. The irradiation with microwaves at multiple frequencies may be performed, for example, at the same position or at different positions. The irradiation with microwaves may be continuously performed, or intermittently performed such that irradiation and halt are repeated. When irradiation with microwaves is performed, the temperature of an object that is irradiated increases, but the intensity of microwave irradiation may be adjusted such that the temperature is kept constant. The temperature of the reaction solution that is irradiated with microwaves may be measured, for example, using a known thermometer such as a thermocouple thermometer or a fiber optic thermometer. The measured temperature may be used to control the power (intensity) of microwaves. The irradiation with microwaves may be performed in a single-mode or a multi-mode.

In the second step, the mixed liquid is added dropwise preferably in an amount that makes the concentration of silver contained in the reaction solution after the dropping of the mixed liquid is ended is 1 wt % or less. The reason for this is that, if the concentration of silver in the reaction solution is high, the silver nanowires obtained become thick. The concentration of silver contained in the reaction solution is the concentration of silver containing all of silver ions, silver elements, and silver compounds. The rate at which the mixed liquid is added dropwise to the reaction solution may be any rate within the range in which silver nanowires can be properly synthesized, but it is preferably lower in order to obtain silver nanowires with a longer average length. For example, the rate at which the mixed liquid is added dropwise is preferably such that the average increase rate of the silver concentration in the reaction solution is 0.6 wt %/h or less, more preferably 0.1 wt %/h or less, and even more preferably 0.04 wt %/h or less. The average increase rate is obtained by dividing the silver concentration (wt %) after the dropping is ended with the dropping time (h). Accordingly, if the dropping rate of the mixed liquid is constant, the silver concentration increases at a rate that is larger than the average increase rate when the dropping is started, and the silver concentration increases at a rate that is smaller than the average increase rate when the dropping is about to be ended.

Furthermore, after the dropping of the mixed liquid is ended, the temperature during the dropping may or may not be maintained. When the period of time during which the temperature during the dropping is maintained after the dropping of the mixed liquid is ended is referred to as a holding time, the holding time may be in the range of 0 to 12 hours. The holding time is preferably in the range of 30 minutes to 2 hours. It seems that silver nanowires grow using silver contained in droplets added dropwise, immediately after the dropping of the mixed liquid, and thus, typically there is no problem even if the holding time is not provided, but it seems that growth of silver nanowires is more completely completed by providing the holding time. Accordingly there is no problem even if the holding time is not long. The silver contained in droplets added dropwise may be silver compound or silver ions. The silver compound may or may not be the silver compound used when mixing.

The second step is performed typically under atmospheric pressure, but also may be performed under increased pressure or under reduced pressure as necessary. From the viewpoint of handleability, atmospheric pressure is desirable. If the pressure is not atmospheric pressure, the boiling point of the reaction solvent is the boiling point at that pressure.

The second step is preferably performed in an inert atmosphere. The inert gas used to form the inert atmosphere may contain at least one selected from among nitrogen, helium, neon, and argon. The state of performing the reaction in the second step in an inert atmosphere may be considered as replacing air that is present in the reactor vessel with inert gas.

In the second step, when the mixed liquid is added dropwise to the reaction solution, silver ions are reduced in the reaction solution, and silver nanowires are obtained. The silver nanowires produced in the second step have an average diameter of 20 to 50 nm and an aspect ratio of 200 to 10000. The aspect ratio may be in the range of 200 to 5000. The aspect ratio is a ratio of the length with respect to the diameter of a nanowire. That is to say aspect ratio=nanowire length/nanowire diameter. The silver nanowires produced in the second step may be purified using a known method. The dispersion of silver nanowires that is mixed with the above-described metal ions may be a dispersion either after or before purification.

Above, the polyol method was described as an example of a method for producing silver nanowires as a starting material for which a local maximum of optical absorption is to be shifted, but it is appreciated that silver nanowires may be produced using a method other than the polyol method, and silver nanowires as a starting material for which a local maximum of optical absorption is to be shifted may be produced using a production method other than the polyol method.

Above, the wavelength of a local maximum of optical absorption in the plasmon absorption band being blue-shifted in the methanol dispersion of silver nanowires was described, but it seems that blue shift of the wavelength of a local maximum of optical absorption in the plasmon absorption band may be seen also in a dispersion of silver nanowires using other solvent.

As described above, according to method for producing silver nanowires of the present invention, it is possible to produce silver nanowires in which the wavelength of a local maximum of optical absorption in the plasmon absorption band in a methanol dispersion has been shifted toward the short wavelength side. It is possible to blue-shift a local maximum of optical absorption without making the wire diameter of silver nanowires smaller, and thus the local maximum can be blue-shifted without lowering the durability or the conductivity. In order to lower the reducing temperature, the metal ions used to produce silver nanowires preferably form an ammine complex, or a metal complex having an organic ligand as a counter anion. The metal complex used to produce silver nanowires may be a copper complex, a nickel complex, or the like, but, in order to lower the optical absorbance in a wavelength band other than a local maximum of optical absorption, it is preferably a copper complex.

Examples and Comparative Examples

Hereinafter, the present invention will be described in detail by way of examples, but these examples are considered in all respects to be illustrative and not restrictive.

Dispersions of silver nanowires were evaluated as in the following procedure to see differences between preparation conditions.

Visible Absorption Spectroscopy

A diluted dispersion obtained by extracting 0.1 g of dispersion and diluting it 50 times (w/w) with methanol solvent was analyzed using the following measuring apparatus under the following machine conditions.

Measuring apparatus: U-3300 Spectrophotometer (manufactured by Hitachi High-Technologies Corporation)

Machine Conditions

Start: 660.00 nm

End: 300.00 nm

Scanning speed: 60 nm/min

Sampling interval: 2.00 nm

Slit: 2 nm

Cell length: 10.0 mm

Measurement of Wire Diameter and Wire Length

The sizes of silver nanowires were measured as in the following procedure to calculate average values.

A diluted dispersion obtained by diluting 10 g of dispersion with methanol to 200 g was put in a centrifuge vessel made of Teflon (registered trademark), and was centrifuged using a centrifugal separator (CAX-371 manufactured by TOMY) at the number of rotations of 2,300 rpm (corresponding to 1,000 G) for 60 minutes, and then a supernatant was removed. Subsequently, washing was performed by repeating, three times, the operation of dispersing the obtained slurry again with the same amount of methanol, and centrifuging them, thereby removing excessive PG solvent and resin (PVP). The obtained silver nanowire dispersion was added dropwise onto an $SiO_2$ substrate and dried at 100° C. The analysis was performed under the following conditions and the sizes of 200 wires were measured, and thus an average diameter and an average length were calculated.

Measuring apparatus: Field Emission Scanning Electron Microscope (FE-SEM, S4800 manufactured by Hitachi High-Technologies Corporation)

Average diameter measurement conditions: accelerating voltage 10 kV WD 8 mm, magnification 100,000 times Average length measurement conditions: accelerating voltage 10 kV WD 8 mm, magnification 1,000 times

Example 1

Preparation of Silver Nanowire Dispersion

At room temperature, 2.25 g of silver nitrate (manufactured by Wako Pure Chemical Industries, Ltd.) and 7.2 g of PVP (weight average molecular weight 50,000, manufactured by Wako Pure Chemical Industries, Ltd.) powder were added little by little to 210 g of PG solvent with vigorous stirring and were dissolved therein, and thus a deep green mixed liquid was prepared.

Silver nanowires were synthesized using a stirrer (Mazela Z2310 manufactured by Tokyo Rikakikai Co, Ltd.) attached with a sealing plug made of polytetrafluoroethylene (PTFE), and a reaction device including: a 1,000-mL round-bottom flask made of glass having a nitrogen introduction neck, a thermocouple insertion opening, and a mixed liquid dropping inlet; and a PTFE crescent-shaped blade as a mixing impeller. This reaction device was installed in a multi-mode microwave irradiation apparatus (μ-Reactor Ex manufactured by Shikoku Instrumentation Co., Ltd.; maximum power 1,000 W, oscillating frequency 2.45 GHz), and the entire solution was heated through irradiation with microwaves. The temperature was controlled by measuring the temperature in the solution using a thermocouple, and performing programmed control of the microwave power such that the measured temperature matched a set temperature.

Then, 200 g of PG solvent and 0.055 g of tetrabutylammonium salt were put into the 1,000-mL glass vessel and were completely dissolved therein through stirring at room temperature, and thus a reaction solution was prepared. As the tetrabutylammonium salt, a mixture of tetrabutylammonium chloride and tetrabutylammonium bromide mixed in a molar ratio of 86:14 was used. After the inside of the vessel was replaced by nitrogen gas, inert atmosphere was maintained with a continuous flow of nitrogen gas at a rate of 100 ml/min. The temperature of the reaction solution in the glass vessel was increased from room temperature to 150° C. at a temperature increase rate of 10° C./min through microwave irradiation, and the temperature of the solution was maintained. The mixed liquid of silver nitrate at 30° C. was added dropwise for 4 hours using a metering pump (SIMDOS02 manufactured by KNF), and then the temperature was maintained further for 60 minutes, and thus silver nanowires were synthesized. Then, the obtained greenish gray solution was cooled to room temperature, and thus a dispersion of silver nanowires (this dispersion was taken as a dispersion A) was obtained.

Surface Modification of Silver Nanowires

After 1.080 g of PVP (weight average molecular weight 50,000, manufactured by Wako Pure Chemical Industries, Ltd.) was dissolved in 28.920 g of PG solvent, 0.370 g of copper acetate monohydrate powder (manufactured by Wako Pure Chemical Industries, Ltd.) was mixed therewith and stirred with the application of heat at 50° C. so that the copper complex was dissolved. The copper complex solution was mixed with 200.0 g of the silver nanowire dispersion (the dispersion A), and thus a mixed liquid was prepared. The ratio (atomic ratio) of copper atoms with respect to silver atoms was 0.50.

A stirrer (Mazela Z2310 manufactured by Tokyo Rikakikai Co, Ltd.) attached with a sealing plug made of polytetrafluoroethylene (PTFE), and a reaction device including a 500-mL round-bottom flask made of glass having a nitrogen introduction neck and a thermocouple insertion opening, and a PTFE crescent-shaped blade as a mixing impeller were used. This reaction device was installed in a multi-mode microwave irradiation apparatus (μ-Reactor Ex manufactured by Shikoku Instrumentation Co., Ltd.; maximum power 1,000 W, oscillating frequency 2.45 GHz), and the entire mixed liquid was heated through irradiation with microwaves. The temperature was controlled by measuring the temperature in the liquid using a thermocouple, and performing programmed control of the microwave power such that the measured temperature matched a set temperature.

The thus prepared mixed liquid was placed into the round-bottom flask, and, after the inside of the vessel was replaced by nitrogen gas, inert atmosphere was maintained with a continuous flow of nitrogen gas at a rate of 100 ml/min. The temperature of the mixed liquid in the glass vessel was increased from room temperature to 150° C. at a temperature increase rate of 10° C./min through microwave irradiation. The color of the mixed liquid changed from greenish gray to reddish brown 10 minutes after the temperature reached 150° C., and thus it was seen that copper ions were reduced and copper nanoparticles were produced. After the temperature reached 150° C., this temperature was maintained for 60 minutes and the reaction was completed, and the obtained reddish brown solution was cooled to room temperature (this dispersion was taken as a dispersion B).

Then, 60 g of 28% ammonia aqueous solution was added dropwise for 5 minutes to the reaction solution with stirring at room temperature in air. After the dropping, the stirring was performed for another 1 hour, and thus it was seen that the color of the reaction solution returned to greenish gray (this dispersion was taken as a dispersion C), after which 240 g of ethyl acetate was added dropwise for 5 minutes. Through this poor-solvent crystallization, a nanowire deposit was obtained. The supernatant solution was a mixed liquid of ethyl acetate and PG solvent, and was a light blue liquid, that is, copper ions were extracted to the supernatant.

After the supernatant of the crystallization solution was removed through decantation, the deposit mainly composed of nanowires and PVP resin was diluted with methanol to 200 g, and the dispersion was put in a centrifuge vessel made of Teflon (registered trademark), and was centrifuged using a centrifugal separator (CAX-371 manufactured by TOMY) at the number of rotations of 2,300 rpm (corresponding to 1,000 G) for 60 minutes and then a supernatant was removed. Subsequently, washing was performed by repeating, three times, the operation of dispersing the obtained slurry again with the same amount of methanol, and centrifuging them, thereby removing excessive PG solvent and resin (PVP), and thus a target dispersion of silver nanowires was obtained.

Change in Absorption Spectra of Obtained Reaction Solutions

When changes in the plasmon absorption band of the silver nanowire dispersion in each reaction stage were checked, the following changes over time were observed. FIG. 1 shows absorption spectra of diluted dispersions obtained by extracting 0.1 g of each of the dispersions A, B, and C in the above-described procedure, and diluting it to 100 times (w/w) with methanol solvent. The quadrangular frame in FIG. 1 shows an enlarged diagram in the vicinity of 325 to 415 nm.

The dispersion (the dispersion A) immediately after synthesis of silver nanowires exhibited the plasmon absorption band with two peak tops at 347 nm and 371 nm, whereas the dispersion (the dispersion B) obtained by adding copper acetate and heating the mixture exhibited plasmon absorption unique to silver nanowires with a peak top only at 360 nm. Furthermore it is seen that plasmon absorption unique to copper nanoparticles was exhibited in the vicinity of 600 nm. Meanwhile, the dispersion C obtained through exposure to air and then ammonia treatment exhibited only the plasmon absorption band unique to silver nanowires with a peak top only at 360 nm, with the plasmon absorption band of copper nanoparticles at 600 nm having disappeared. It is seen that the optical absorbance of the dispersion C at 550 to 650 nm was smaller than that of the dispersion B. It is seen from this result that the dispersions B and C were dispersions of silver nanowires in which the absorption band in a visible light region had been on the whole blue-shifted (i.e., shifted toward the short wavelength side). Furthermore, it is seen that, in order to eliminate the plasmon absorption band of copper nanoparticles and to lower the optical absorbance at 550 to 650 nm, it is preferable to remove copper precipitated on the surface of the silver nanowires.

Shape of Silver Nanowires Contained in Obtained Reaction Solution

Figure 2:
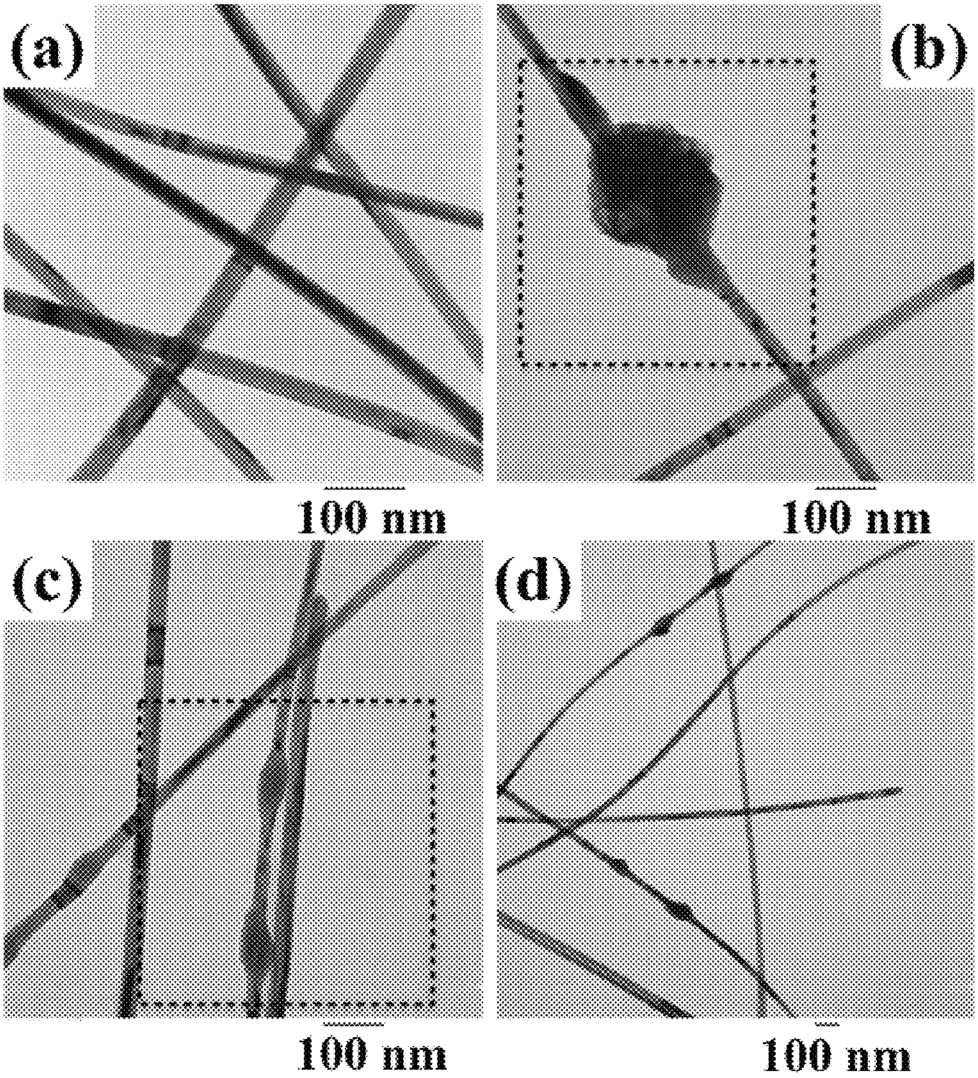
FIG. 2 shows TEM images of the dispersions A, B, and C obtained in Example 1.

The shape of silver nanowires in each reaction stage was observed using a transmission electron microscope (TEM: H800EDX manufactured by 10 Hitachi High-Technologies Corporation, accelerating voltage 200 kV). The purified methanol diluted dispersion was added dropwise onto an elastic carbon support film Mo grid (ELS-M10 manufactured by Okenshoji Co., Ltd.), and dried in vacuum at 40° C., thereby removing the solvent, and the thus obtained material was used. FIG. 2 shows TEM images obtained from dispersions after purifying the dispersions A, B, and C through centrifugal separation. FIG. 2(*a*) is a TEM image of the dispersion A, FIG. 2(*b*) is a TEM image of the dispersion B, and FIGS. 2(*c*) and 2(*d*) are TEM images of a dispersion obtained by purifying the dispersion C. It was seen that the silver nanowires of the dispersion A were in the shape of straight wires, whereas the silver nanowires of the dispersion B were in the shape of wires partially with clumps bulging like balloons and slightly bulging portions on both ends thereof. It was seen from element analysis on the region enclosed by the quadrangle in FIG. 2(*b*) through EDX (energy dispersive X-ray spectrometry) that substances in this region contained copper and silver atoms, that is, were composed of copper and silver. On the other hand, the silver nanowires of the dispersion C were in the shape of wires in which the balloon-like bulging clumps disappeared, and only bulging portions on both ends thereof remained. It was seen from element analysis on the region enclosed by the quadrangle in FIG. 2(*c*) through EDX that substances in this region contained only silver atoms, that is, concavo-convex wires composed of silver were formed. Accordingly, it seems that the balloon-like clumps in the silver nanowires of the dispersion B were clumps of copper, and bulging portions on both sides thereof were clumps of silver.

Change in Sizes of Obtained Silver Nanowires

Figure 3:
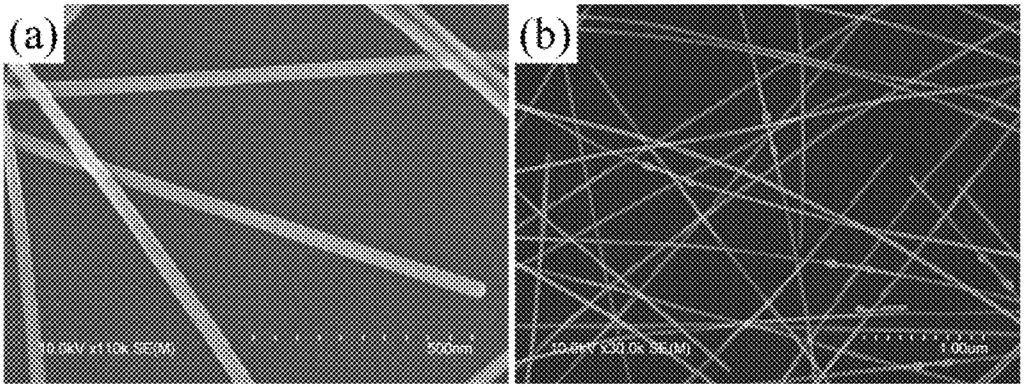
FIG. 3 shows FE-SEM images of the dispersions A and C obtained in Example 1.

FIG. 3 shows FE-SEM images of methanol dispersions obtained by washing the dispersions A and C through centrifugal separation. FIG. 3(*a*) is an FE-SEM image of the dispersion A, and FIG. 3(*b*) is an FE-SEM image of the dispersion C. It was seen that the silver nanowires of the dispersion A were composed of an edge material with a pentagonal cross-section, whereas the silver nanowires of the dispersion C partially had metal clumps. It was seen from the measurement of the wire diameter and the wire length of 200 silver nanowires of the dispersion A that the average diameter was 33.4 nm (standard deviation 3.0 nm), and the average length was 9.8 μm (standard deviation 4.9 μm). The average diameter was calculated by measuring the thickness at an arbitrarily selected one point per wire, and averaging the measured values of 200 wires.

Change in Thickness of Each Silver Nanowire

The change in the wire diameter (change in the thickness) of each wire was measured in the FE-SEM images of the dispersions A and C following the conditions below. The thickness was measured for each 50 nm from one end of each wire, and the average value and the standard deviation of each wire were calculated. Table blow shows the result of performing this measurement for ten wires.

It was seen that, in the dispersion A, the silver nanowires had almost no variations in the thickness per wire, and extended in the same thickness. On the other hand, in the dispersion C subjected to surface treatment, the wires partially had metal clumps, had a thickness of 35 to 80 nm, and had CV which indicates variations in the thickness of each wire, of average 26.8% that was about five times the average 5.3% of the dispersion A. In the dispersion C, the average diameter of each silver nanowire was more than 35 nm, and thus the value obtained by averaging the average diameters of ten wires was more than 35 nm as well. Accordingly in such silver nanowires with an average diameter of more than 35 nm, a local maximum of optical absorption in the plasmon absorption band was shifted toward the short wavelength side.

The measurement results of the dispersion A were as follows.

TABLE 1

| Wire No. | Average (nm) | SD (nm) | CV (%) |
|---|---|---|---|
| 1 | 32.0 | 1.8 | 5.6 |
| 2 | 32.6 | 1.5 | 4.6 |
| 3 | 30.4 | 1.8 | 5.9 |
| 4 | 31.6 | 2.0 | 6.3 |
| 5 | 31.4 | 1.7 | 5.4 |
| 6 | 39.4 | 1.8 | 4.6 |
| 7 | 32.0 | 1.5 | 4.7 |
| 8 | 34.3 | 1.4 | 4.1 |
| 9 | 36.2 | 2.0 | 5.5 |
| 10 | 33.2 | 2.2 | 6.6 |

The measurement results of the dispersion C were as follows.

| Wire No. | Average (nm) | SD (nm) | CV (%) |
|---|---|---|---|
| 1 | 37.9 | 10.8 | 28.5 |
| 2 | 35.8 | 9.6 | 26.8 |
| 3 | 36.5 | 9.3 | 25.5 |
| 4 | 38.5 | 11.2 | 29.1 |
| 5 | 36.2 | 8.8 | 24.3 |
| 6 | 37.2 | 9.8 | 26.3 |
| 7 | 35.3 | 8.6 | 24.4 |
| 8 | 38.8 | 11.9 | 30.7 |
| 9 | 36.4 | 9.3 | 25.5 |
| 10 | 37.6 | 10.2 | 27.1 |

Example 2

Surface modification of silver nanowires was performed as in Example 1, except that the amount of copper acetate monohydrate was changed to 0.074 g, 0.222 g, or 0.74 g. The atomic ratios (ratios of copper atoms with respect to silver atoms) corresponding to the amounts of copper acetate monohydrate were 0.10, 0.30, and 1.0, respectively.

Figure 4:
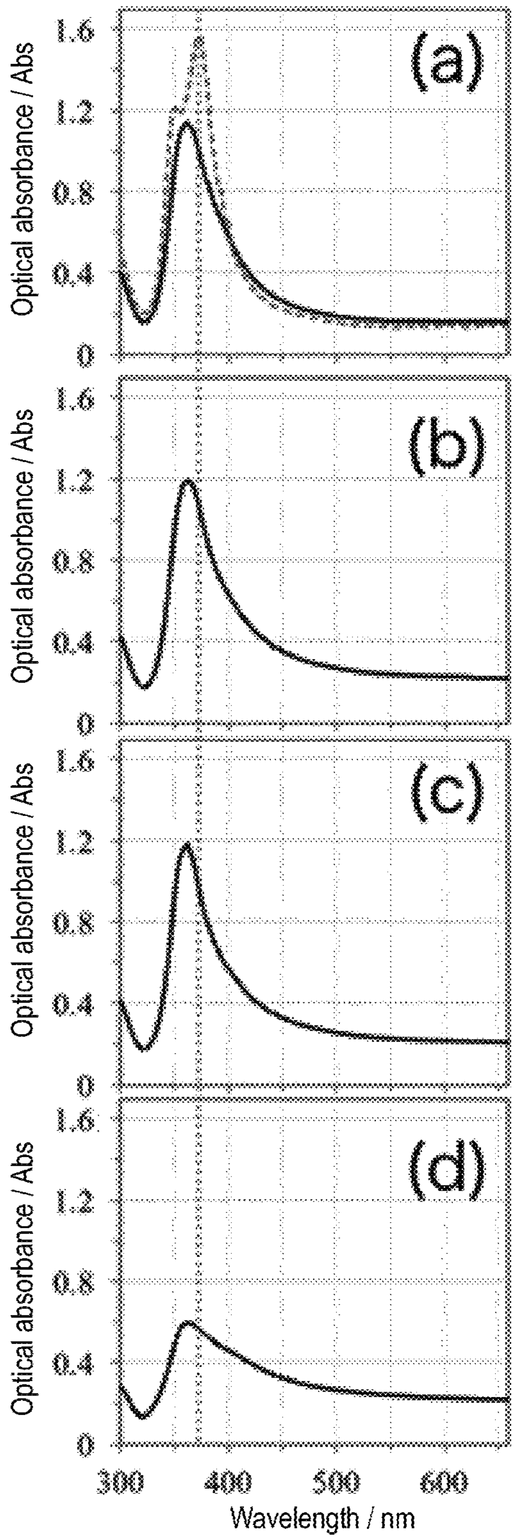
FIG. 4 shows graphs of absorption spectra of dispersions obtained in Examples 1 and 2.

FIG. 4 shows graphs of absorption spectra of methanol dispersions after purifying the dispersion C of Examples 1 and 2. In FIG. 4(*a*), the solid line is an absorption spectrum of the dispersion after purifying the dispersion C with a ratio of copper atoms with respect to silver atoms of 0.1, and the dotted line is an absorption spectrum of the dispersion A before surface treatment. FIGS. 4(*b*), 4(*c*), and 4(*d*) show absorption spectra of the dispersion after purifying the dispersion C with ratios of copper atoms with respect to silver atoms of 0.3, 0.5, and 1.0, respectively. It is seen from FIG. 4 that, in order to blue-shift a peak top of plasmon absorption of silver from 371 nm to 360 nm through surface modification, it is sufficiently effective to add even a small amount of copper such as in a ratio of copper atoms with respect to silver atoms of approximately 0.10. On the other hand, if the ratio of copper atoms with respect to silver atoms was set to 1.0, a peak top of plasmon absorption of silver was blue-shifted in a similar manner, but the absorption was broad over 320 to 450 nm. Accordingly, the copper complex that is mixed with a dispersion of silver nanowires is preferably mixed such that the ratio of copper atoms with respect to silver atoms is 0.9 or less.

Example 3

Surface modification of silver nanowires was performed as in Example 1, except that nickel acetate tetrahydrate was used instead of copper acetate monohydrate. Note that, contrary to Example 1, the ammonia aqueous solution was not added dropwise. The reason for this is that, in the case of nickel, nickel precipitated on the surface of the silver nanowires does not have to be removed. The amount of nickel acetate tetrahydrate used, the atomic ratio in the mixed liquid, and the absorption maximum wavelength were as listed in the table below. The target dispersion of silver nanowires was obtained by washing the obtained dispersion through centrifugal separation.

TABLE 3

| | Nickel acetate tetrahydrate (g) | Atomic ratio (/) | Absorption maximum wavelength (nm) |
|---|---|---|---|
| No. 1 | 0.460 | 0.50 | 362 |
| No. 2 | 0.277 | 0.30 | 362 |
| No. 3 | 0.092 | 0.10 | 364 |
| No. 4 | 0.046 | 0.05 | 366 |
| No. 5 | 0.018 | 0.02 | 370 |

TEM Images

FIG. 5 shows TEM images of the obtained dispersions of silver nanowires. FIGS. 5(*a*) to 5(*c*) respectively show TEM images of the dispersions of silver nanowires after surface modification respectively corresponding to Nos. 1, 3, and 4 above, and FIG. 5(*d*) is a diagram illustrating precipitation of nickel on a silver nanowire surface. As shown in FIG. 5(*d*), in reaction using nickel acetate, nickel is precipitated in a plate form on the surface of a silver nanowire. It is seen from FIGS. 5(*a*) to 5(*c*) that the size of nickel crystals precipitated on the surface of the silver nanowires depended on the amount of nickel ions added. That is to say, the size of nickel crystals precipitated on the surface of the silver nanowires was approximately 40 nm in the sample No. 1, and was approximately 10 to 20 nm in the sample No. 4.

Change in Absorption Spectrum

Figure 6:
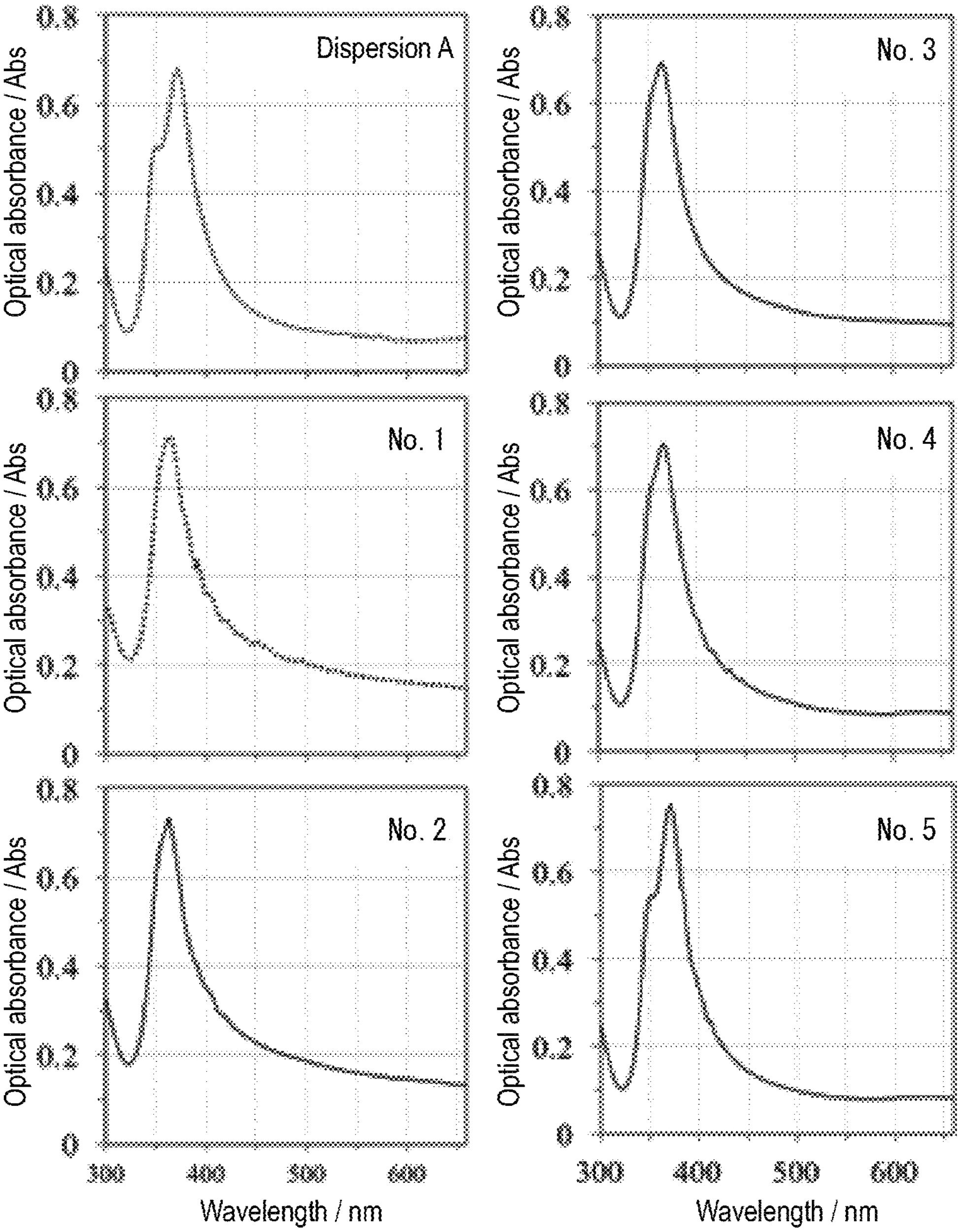
FIG. 6 shows graphs of absorption spectra of the dispersions obtained in Example 3.

FIG. 6 shows graphs of absorption spectra of dispersions obtained by diluting the obtained dispersions with methanol. As shown in the table above listing the absorption maximum wavelengths, the maximum wavelength in the plasmon absorption band of silver nanowires was blue-shifted by increasing the amount of nickel added. Note that the ratio of nickel atoms with respect to silver atoms was preferably more than 0.02 because the change from the absorption spectrum of the silver nanowires before surface modification was very small in the case of the atomic ratio/0.02 in the mixed liquid of No. 5.

Test Example 1

In this example, 0.370 g of copper acetate monohydrate and 1.080 g of PVP (weight average molecular weight 50,000) were mixed in 28.92 g of PG solvent and stirred with the application of heat at 50° C. so that the copper complex was dissolved. The temperature of this copper complex was increased to 150° C. at a temperature increase rate of 10° C./min in a nitrogen atmosphere using the same reaction device as in Example 1, and the temperature was maintained for 2 hours. Even after 2 hours, the color of the solution did not change.

Test Example 2

The experiment was performed as in Test Example 1, except that the temperature after temperature increase was changed to 165° C. After the elapse of approximately 1 hour after the temperature was set to 165° C., the color of the solution changed from green to reddish brown, that is, it was seen that copper ions were reduced and copper nanoparticles were produced.

It is seen from the results of Test Examples 1 and 2 and Example 1, when silver nanowires are present, reduction of copper ions is facilitated even at a low temperature such as 150° C. because silver functions as a catalyst. Since reduction of copper ions and precipitation of copper (0) occur on the surface of the silver nanowires, the silver surface can be efficiently covered by copper. On the other hand, in the case of reaction at a temperature of 165° C. or more, reduction of copper and precipitation of copper nanoparticles independently occur in PG solvent, and thus the amount of copper used for surface modification of silver nanowires decreases, and the effect of surface modification of silver nanowires decreases, which is not preferable. Accordingly when mixing the dispersion of silver nanowires and the copper complex, the heating temperature is preferably less than 165° C.

The present invention is not limited to the examples set forth herein. Various modifications are possible within the scope of the present invention.

The silver nanowires produced using the method for producing silver nanowires according to the present invention, and silver nanowires, a dispersion, and a transparent conductive film using the same according to the present invention can be used, for example, for touch panels and the like.

The invention claimed is:

1. A silver nanowire, comprising:

a trunk portion consisting of silver, and metal clumps located intermittently on a surface of the trunk portion along a length direction, wherein the metal clumps are chemically bonded to the surface of the trunk portion, wherein the metal clumps are clumps of metal that is different from silver, and wherein each of the metal clumps has an exposed surface.

2. The silver nanowire according to claim 1, wherein the metal clumps are clumps of one or more transition metals selected from the group consisting of copper, nickel, iron, cobalt, and combinations thereof.

3. The silver nanowire according to claim 1, wherein the silver nanowire has a diameter of 15 nm to 100 nm.

4. The silver nanowire according to claim 1, wherein each metal clump has a thickness of 1.1 to 5 times a diameter of the trunk portion.

5. A dispersion comprising the silver nanowire according to claim 1.

6. A transparent conductive film comprising the silver nanowire according to claim 1.

* * * * *